(12) United States Patent
Steele, III et al.

(10) Patent No.: US 12,307,270 B2
(45) Date of Patent: May 20, 2025

(54) METHOD OF GENERATING A TERMINAL INTERFACE

(71) Applicant: Quick Quack Car Wash Holdings, LLC, Roseville, CA (US)

(72) Inventors: Joseph Allen Steele, III, Plumas Lake, CA (US); Josh David Schumacher, Sacramento, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/196,272

(22) Filed: May 11, 2023

(65) Prior Publication Data

US 2024/0378063 A1 Nov. 14, 2024

(51) Int. Cl.
*G06F 9/451* (2018.01)
*H04L 9/32* (2006.01)

(52) U.S. Cl.
CPC ............ *G06F 9/451* (2018.02); *H04L 9/3213* (2013.01)

(58) Field of Classification Search
CPC .............................. G06F 9/451; H04L 9/3123
See application file for complete search history.

(56) References Cited

U.S. PATENT DOCUMENTS

| | | | |
|---|---|---|---|
| 7,761,885 B2 * | 7/2010 | Labrou | G06F 9/465 |
| | | | 719/330 |
| 8,291,408 B1 * | 10/2012 | Czymontek | G06F 8/34 |
| | | | 717/113 |
| 10,482,421 B1 | 11/2019 | Ducrou | |
| 10,922,743 B1 | 2/2021 | Andrizzi | |
| 11,263,063 B1 * | 3/2022 | Lamacchia | H04L 9/50 |
| 11,443,260 B1 | 9/2022 | Van | |
| 11,635,889 B1 * | 4/2023 | Swanson | G06F 3/0481 |
| | | | 715/764 |
| 2004/0250072 A1 * | 12/2004 | Ylonen | H04L 63/0428 |
| | | | 713/170 |
| 2006/0080534 A1 * | 4/2006 | Yeap | G06F 21/33 |
| | | | 713/176 |
| 2007/0088583 A1 * | 4/2007 | Chen | G06Q 10/0633 |
| | | | 705/7.27 |
| 2008/0293375 A1 * | 11/2008 | Swanburg | H04M 11/002 |
| | | | 455/405 |
| 2012/0124049 A1 * | 5/2012 | Akiyama | G06Q 30/02 |
| | | | 707/E17.089 |
| 2012/0287281 A1 | 11/2012 | Williams | |
| 2013/0027227 A1 * | 1/2013 | Nordstrom | G01C 21/3438 |
| | | | 340/990 |
| 2015/0347374 A1 * | 12/2015 | Rehtijärvi | G06F 21/51 |
| | | | 715/747 |
| 2018/0144256 A1 * | 5/2018 | Saxena | G06N 20/00 |
| 2018/0246961 A1 * | 8/2018 | Gibson | G06F 3/165 |

(Continued)

*Primary Examiner* — Eric J. Bycer
(74) *Attorney, Agent, or Firm* — Caldwell Intellectual Property Law

(57) ABSTRACT

The present disclosure is generally related to apparatus and methods for a point-of-sale (POS) terminal configured to receive user data, classify the user data to a category, and generate a token as a function of the category. The POS terminal may be configured to associate the token with a plurality of service identifiers, generate a customer interface as a function of the token, and receive an activation of an event handler of the plurality of event handlers, and initiate as a function of the activation, an automated process.

18 Claims, 7 Drawing Sheets

(56) References Cited

U.S. PATENT DOCUMENTS

| | | | |
|---|---|---|---|
| 2019/0141029 A1* | 5/2019 | Dube | H04L 63/102 |
| 2020/0005284 A1* | 1/2020 | Vijayan | H04L 63/08 |
| 2020/0213121 A1* | 7/2020 | Hioki | H04L 9/3239 |
| 2020/0242105 A1* | 7/2020 | Rich | H04L 67/1097 |
| 2020/0384960 A1* | 12/2020 | Mayer | G06Q 10/20 |
| 2022/0069996 A1* | 3/2022 | Xue | H04L 9/3239 |
| 2022/0141231 A1* | 5/2022 | Simons | G06N 20/00 |
| | | | 726/4 |
| 2022/0191195 A1* | 6/2022 | Moros Ortiz | H04L 63/105 |
| 2023/0042500 A1* | 2/2023 | Grix | H04L 9/3213 |
| 2023/0162544 A1* | 5/2023 | Hua | H04W 12/069 |
| | | | 340/5.72 |
| 2023/0385815 A1* | 11/2023 | Jakobsson | G06Q 20/36 |

* cited by examiner

METHOD OF GENERATING A TERMINAL INTERFACE

FIELD OF THE INVENTION

The present invention generally relates to the field of artificial intelligence. In particular, the present invention is directed to a method and an apparatus for a point-of-sale terminal.

BACKGROUND

Terminals can have inadequate dynamic user interface configurations due to outdated software and hardware. Present solutions are costly and inefficient.

SUMMARY OF THE DISCLOSURE

In an aspect a terminal, the terminal comprising: at least a processor; and a memory communicatively connected to the at least processor, the memory containing instructions configuring the at least processor to receive user data, classify the user data to a category. The processor may be configured to generate a token as a function of the category, wherein generating the token may include accessing a general list of recommendations, comparing the general list of recommendations to the user data, wherein the user data comprises selections, determining at least a service recommendation as a function of comparing the general list to the user data, and generating a token as a function of the at least service recommendation. Further, the processor may be configured to associate the token with a plurality of service identifiers, generate an interface data structure as a function of the token, wherein generating the interface data structure further comprises generating a plurality of event handlers and associated display elements, and receive, from the user device, an activation of an event handler of the plurality of event handlers. Moreover, the processor may be configured to initiate, as a function of the activation, an automated process.

In another aspect a method for generating a point-of-sale (POS) interface, the method may include receiving, by a processor, user data, classifying, by the processor, the user data to a category, and generating, by the processor, a token as a function of the category, wherein generating the token. Generating the token may include accessing a general list of recommendations, comparing the general list of recommendations to the user data, wherein the user data comprises selections, determining at least a service recommendation as a function of comparing the general list to the user data, and generating a token as a function of the at least recommendation. Further, the method may include associating, by the processor, the token with a plurality of service identifiers, generating, by the processor, an interface data structure as a function of the token, wherein generating the interface data structure further comprises generating a plurality of event handlers and associated display elements, and receiving, from the user device, an activation of an event handler of the plurality of event handler. Moreover, the method may include initiating, as a function of the activation, an automated process.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for a point-of-sale terminal. In an embodiment, method may include generating a user interface as a function. Exemplary embodiments illustrating aspects of the present disclosure are described below in the context of several specific examples.

Figure 1:
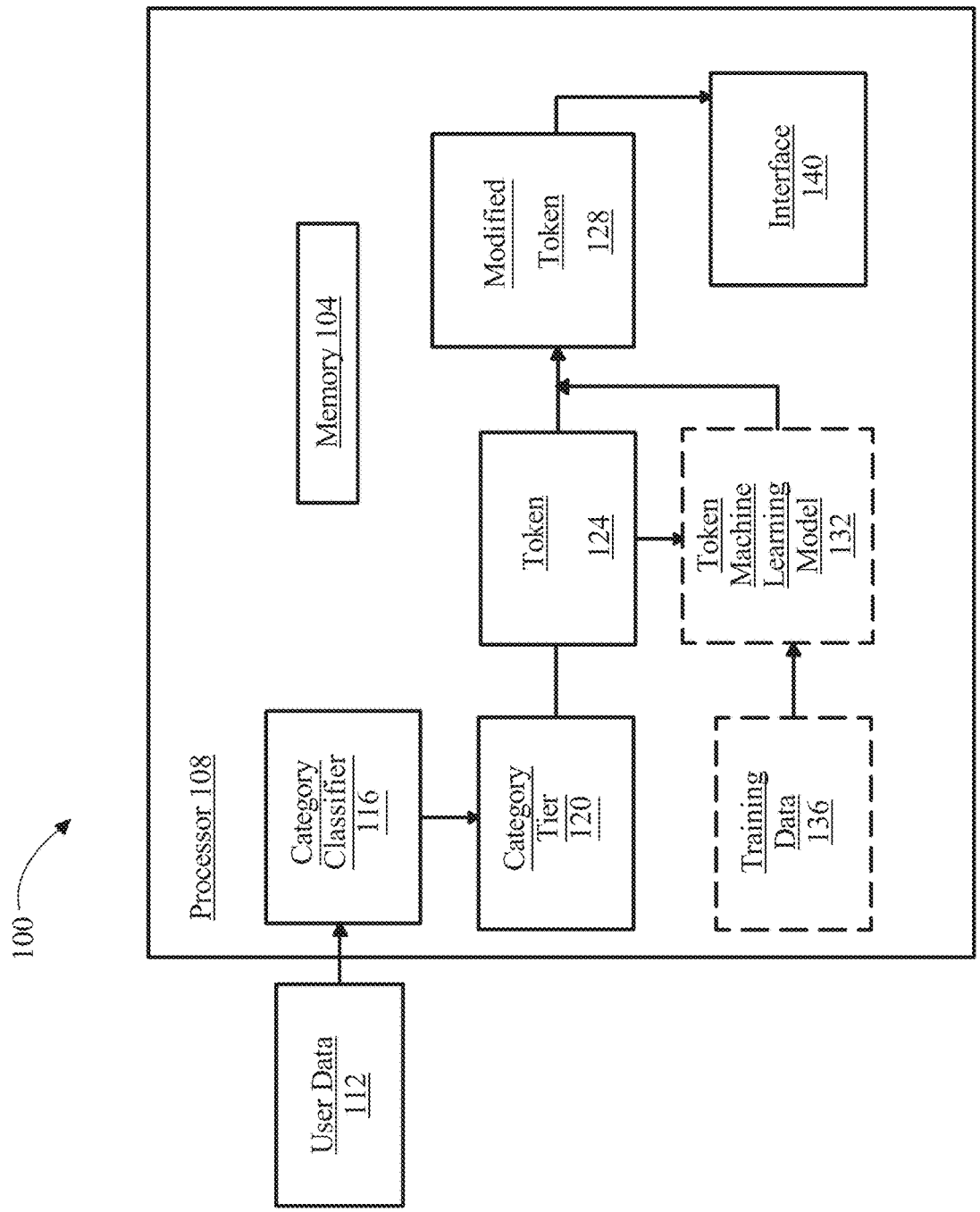
FIG. 1 is a block diagram of an apparatus for a terminal.

Referring now to FIG. 1, an exemplary embodiment of an apparatus 100 for routine improvement for a user is illustrated. Apparatus 100 may include a memory. Apparatus 100 may include a processor. Processor may include, without limitation, any processor described in this disclosure. Apparatus 100 may include any apparatus as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single apparatus operating independently, or may include two or more apparatus operating in concert, in parallel, sequentially or the like; two or more apparatuses may be included together in a single apparatus or in two or more apparatuses. Apparatus 100 may interface or communicate with one or more additional devices as described below in further detail via a network interface device. Network interface device may be utilized for connecting apparatus to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two apparatuses, and any combinations thereof. A network may employ a wired and/or a wireless mode of communication. In general, any network topology may be used. Information (e.g., data, software etc.) may be communicated to and/or from a computer and/or an apparatus. Apparatus 100 may include but is not limited to, for example, an apparatus or cluster of apparatuses in a first location and a second apparatus or cluster of apparatuses in a second location. Apparatus 100 may include one or more apparatuses dedicated to data storage, security, distribution of traffic for load balancing, and the like. Apparatus may distribute one or more computing tasks as described below across a plurality of apparatuses of apparatus, which may operate in parallel, in series, redundantly, or in any other manner used for distribution of tasks or memory between apparatus. Apparatus 100 may be implemented, as a non-limiting example, using a "shared nothing" architecture.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may receive user data 112. As used in this disclosure, "user data" is data associated with a user of interest. In some embodiments, user data 112 may include a user, or a company associated with a user. User data may include, for example, data describing the company's financial projections, data describing the company's business model, data describing company employees, data describing the user, and data describing other entities in the company's industry. In some embodiments, user data 112 may include financial data, such as current financial data associated with the user. Financial data may include, for example, revenue of a company, profit of a company, and income of a user. Financial data may be received, for example, from a company's internal auditing process or from a public company's financial reports. In some embodiments, user data 112 may be collected via direct user textile input, a web crawler, speech recognition, or the like. As a non-limiting example, user data 112 may include an analysis of user speech. Speech data may be collected, for example, by prompting a user to discuss a user and recording user speech, or by searching online (e.g., social media sites) for spoken discussions of a user. User speech may be analyzed to determine, for example, the level of excitement or confidence the user feels about the company. Machine learning may be used to analyze user speech.

Machine learning model may be any suitable machine learning model as mentioned in this disclosure. A machine learning model may be trained on historical speech samples tagged with, for example, confidence and excitement ratings. A machine learning model may use a speech recording as an input and may output confidence and excitement ratings.

With continued reference to FIG. 1, in some embodiments, apparatus 100 may include a language processing module to process user data 112. A language processing module may include any hardware and/or software module. A language processing module may be configured to extract, from one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into character tokens, which may include a simple word (sequence of letters separated by whitespace) or more generally a sequence of characters as described previously. The term "character token," as used herein, refers to any smaller, individual groupings of text from a larger source of text; tokens may be broken up by word, pair of words, sentence, or other delimitation. These character tokens may in turn be parsed in various ways. Textual data may be parsed into words or sequences of words, which may be considered words as well. Textual data may be parsed into "n-grams", where all sequences of n consecutive characters are considered. Any or all possible sequences of character tokens or words may be stored as "chains", for example for use as a Markov chain or Hidden Markov Model.

Still referring to FIG. 1, a language processing module may operate to produce a language processing model. A language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, a language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an iduser element, and existence of an inverse element for each vector, and can be multiplied by scalar values under an operation of scalar multiplication compatible with field multiplication, and that has an iduser element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such iduser to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York. In some embodiments, apparatus 100 may determine one or more characters, symbols, strings, phrases, and the like of user input. Apparatus 100 may determine one or more characters, symbols, strings, phrases, and the like using a language processing module as described above. Apparatus 100 may compare determined text of user input and/or other input through comparing received input, such as user input, to one or more databases. Databases may include, without limitation, warehouse management systems, websites, and the like.

With continued reference to FIG. 1, user data 112 may include information such as and without limitations, age, gender, marital and/or family status, previous work history, previous education history and the like. In some embodiments, user data 112 may be received through an input device. In some instances, input device may include apparatus 100. In some instances, input device may include a remote device. In instances where user data 112 is input into a remote input device, remote device may transmit user data 112 across a wireless connection. In some embodiments, wireless connection may be any suitable connection (e. g., radio, cellular). In some instances, input device may include a computer, laptop, smart phone, tablet, or things of the like. In some instances, user data 112 may be stored in a data store and associated with a user account. It should be noted that data store may be accessed by any input device, using authorization credentials associated with user data 112. In some instances, user data 112 may be created and stored via a laptop and accessed from tablet, using authorization credentials.

With continued reference to FIG. 1, apparatus 100 may receive user data 112 at processor 108. In some embodiments, processor 108 may have formatting requirements to ensure efficient processing and output of data from processor 108. Keeping that in mind, apparatus 100 may utilize processor 108 to perform pre-processing on user data 112. It should be noted that processor 108 may perform pre-processing for any data input to apparatus 100. Methods of pre-processing may include interpolation processes as discussed in more detail below.

Still referring to FIG. 1, processor 108 may use interpolation and/or up sampling methods to process user data 112. For instance, where authentication credentials include image data, processor 108 may convert a low pixel count image into a desired number of pixels need to for input into an image classifier; as a non-limiting example, an image classifier may have a number of inputs into which pixels are input, and thus may require either increasing or decreasing the number of pixels in an image to be input and/or used for training image classifier, where interpolation may be used to increase to a required number of pixels. As a non-limiting example, a low pixel count image may have 100 pixels, however the number of pixels needed for an image classifier may be 128. Processor 108 may interpolate the low pixel count image to convert the 100 pixels into 128 pixels so that a resultant image may be input into an image classifier. It should be noted that image classifier may be any classifier as described in this disclosure. It should also be noted that one of ordinary skill in the art, upon reading this disclosure, would know the various methods to interpolate a low pixel count image to a desired number of pixels required by an image classifier. In some instances, a set of interpolation rules may be trained by sets of highly detailed images and images that may have been downsampled to smaller numbers of pixels, for instance and without limitation as described below, and a neural network or other machine learning model that is trained using the training sets of highly detailed images to predict interpolated pixel values in a facial picture context. As a non-limiting example, a sample picture with sample-expanded pixels (e.g., pixels added between the original pixels) may be input to a neural network or machine learning model and output a pseudo replica sample-picture with dummy values assigned to pixels between the original pixels based on a set of interpolation rules. In some instances, image classifier and/or another machine learning model may have a set of interpolation rules trained by sets of highly detailed images and images that have been down sampled to smaller numbers of pixels, and a neural network or other machine learning model that is trained using those examples to predict interpolated pixel values in a facial picture context. I.e., you run the picture with sample-expanded pixels (the ones added between the original pixels, with dummy values) through this neural network or model and it fills in values to replace the dummy values based on the rules.

Still referring to FIG. 1, processor 108 may utilize sample expander methods, a low-pass filter, or both. As used in this disclosure, a "low-pass filter" is a low-pass filter is a filter that passes signals with a frequency lower than a selected cutoff frequency and attenuates signals with frequencies higher than the cutoff frequency. The exact frequency response of the filter depends on the filter design. In some embodiments, processor 108 may use luma or chroma averaging to fill in pixels in between original image pixels. Processor 108 may down-sample image data to a lower number of pixels to input into an image classifier. As a non-limiting example, a high pixel count image may have 356 pixels, however the number of pixels needed for an image classifier may be 128. Processor 108 may downsample the high pixel count image to convert the 356 pixels into 128 pixels so that a resultant image may be input into an image classifier.

In some embodiments, and with further reference to FIG. 1, processor may be configured to perform down sampling on data such as without limitation image data. For instance, and without limitation, where an image to be input to image classifier, and/or to be used in training examples, has more pixel than a number of inputs to such classifier. Down sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Continuing to refer to FIG. 1, any training data described in this disclosure may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine learning processes, models, and/or classifiers as described in further detail below. In some embodiments, training data may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine learning processes, models, and/or classifiers as described in further detail below.

Still referring to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database, a key-value retrieval datastore such as a NOSQL database, or any other format or structure for use as a datastore that a person skilled in the art would recognize as suitable upon review of the entirety of this disclosure. An image database may include a plurality of data entries and/or records corresponding to user tests as described above. Data entries in an image database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in an image database may reflect categories, cohorts, and/or populations of data consistently with this disclosure. Image database may be located in memory 104 or on another device in and/or in communication with apparatus 100.

Still referring to FIG. 1, an exemplary embodiment of an image database is illustrated. One or more tables in image database may include, without limitation, an image table, which may be used to store images, with links to origin points and/or other data stored in image database and/or used in training data as described in this disclosure. Image database may include an image quality table, where categorization of images according to image quality levels, for instance for purposes of use in image quality-linked training data, may be stored. Image database may include a demographic table; demographic table may include any demographic information concerning users from which images were captured, including without limitation age, sex, national origin, ethnicity, language, religious affiliation, and/or any other demographic categories suitable for use in demographically linked training data as described in this disclosure. Image database may include an anatomical feature table, which may store types of anatomical features, including links to diseases and/or conditions that such features represent, images in image table that depict such features, severity levels, mortality and/or morbidity rates, and/or degrees of acuteness of associated diseases, or the like. Persons skilled in the art, upon reviewing the entirety of this disclosure, will be aware of various alternative or additional data which may be stored in image database.

Referring still to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database, a key-value retrieval datastore such as a NOSQL database, or any other format or structure for use as a datastore that a person skilled in the art would recognize as suitable upon review of the entirety of this disclosure. An image database may include a plurality of data entries and/or records corresponding to user tests as described above. Data entries in an image database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in an image database may reflect categories, cohorts, and/or populations of data consistently with this disclosure. Image database may be located in memory 104 of apparatus 100 and/or on another device in and/or in communication apparatus 100.

Still referring to FIG. 1, processor 108 may receive user data 112 that may include authorization image data. Image data may include pixel data of varying range. In instances where authorization image data does not match stored pixel data, processor 108 may transform authorization image data to stored pixel data. In some embodiments, pre-processing user data 112 may include processor 108 may compare user profile image data to stored pixel data. In some instances, user profile image data may be transformed from its original state. Processor 108 may compare original user profile image data to stored pixel data. User profile image data may differ in pixel count, thus, only a percentage of pixel data may match up. As a non-limiting example, at least 90 percent of pixel data may match. It should be noted that a percent match may be at least 95 percent, at least 90 percent, at least 80 percent, or the like. Processor may flag any user that sends user data 112 that have less than the specified amount of pixel data matchup.

Still referring to FIG. 1, user data 112 may be digital signatures. As a non-limiting example, user may use a device capable of fingerprinting. In some instances, user data 112 may be a digital fingerprint. In some embodiments, digital fingerprint may be a digital scan of user finger, face, or any identifying feature. Digital fingerprint may be stored in a database and retrieved upon processor 108 receiving user data 112 from a user device. Digital fingerprint received from user may be compared to a stored fingerprint associated with user using methods described above. In some instances, digital fingerprint may be an image of an identifying feature. A certainty percentage threshold may be lower for an image of identifying feature in comparison to a digital fingerprint to account for confounding variables including but not limited to camera quality, formatting, transmission packet loss, or the like.

Still referring to FIG. 1, determining apparatus 100 identifier may include identifying device fingerprint data of apparatus 100 and determining the apparatus 100 identifier from the device fingerprint data. "Device fingerprint data," as used in this disclosure, is data used to determine a probable iduser of a device as a function of at least a field parameter a communication from the device. At least a field parameter may be any specific value set by apparatus 100 and/or user thereof for any field regulating exchange of data according to protocols for electronic communication. As a non-limiting example, at least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," "transaction_id," and the like. Determining the iduser of the apparatus 100 may include fingerprinting the apparatus 100 as a function of at least a machine operation parameter described a communication received from the apparatus 100. At least a machine operation parameter, as used herein, may include a parameter describing one or more metrics or parameters of performance for a device and/or incorporated or attached components; at least a machine operation parameter may include, without limitation, clock speed, monitor refresh rate, hardware or software versions of, for instance, components of apparatus 100, a browser running on apparatus 100, or the like, or any other parameters of machine control or action available in at least a communication. In an embodiment, a plurality of such values may be assembled to identify apparatus 100 and distinguish it from other devices.

With continued reference to FIG. 1, determining the apparatus 100 identifier may include receiving a digital signature from apparatus 100 and determining the apparatus 100 identifier from the digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular user; thus, if the certificate authority may be trusted, and the private key has not been stolen, the ability of a user to produce a digital signature confirms the iduser of the user and links the file to the user in a verifiable way. Digital signature may be incorporated in a digital certificate, which is a document authenticating the user possessing the private key by authority of the issuing certificate authority and signed with a digital signature created with that private key and a mathematical representation of the remainder of the certificate. In other embodiments, digital signature is verified by comparing the digital signature to one known to have been created by the user that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, determining apparatus 100 identifier may include receiving a security token issued by one or more third-party devices or services identifying and/or authenticating apparatus 100 and/or a user thereof, such as without limitation security assertions markup language (SAML) token from apparatus 100 and determining the apparatus 100 identifier from the SAML token. SAML tokens are extensible markup language (XML) representations carrying statements that are sets of claims made by one user about another user. For example, in federated security scenarios, statements may be made by a security token service about a user and/or device in a system. A security token service may sign the SAML token, for instance using any digital signature as described above, to indicate veracity of statements contained in the token. In addition, a SAML token may be associated with secret data, such as cryptographic key material that the user of the SAML token may knowledge of, for instance using a digital circuit as described above. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Still referring to FIG. 1, data elements may be listed in an immutable sequential listing; data elements may include any form of data, including textual data, image data, encrypted data, cryptographically hashed data, and the like. Data elements may include, without limitation, one or more at least a digitally signed assertions. In one embodiment, a digitally signed assertion is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion. In an embodiment, collection of textual data states that the owner of a certain transferable item represented in a digitally signed assertion register is transferring that item to the owner of an address. A digitally signed assertion may be signed by a digital signature created using the private key associated with the owner's public key, as described above.

Still referring to FIG. 1, a digitally signed assertion may describe a transfer of virtual currency, such as cryptocurrency as described below. The virtual currency may be a digital currency. Item of value may be a transfer of trust, for instance represented by a statement vouching for the iduser or trustworthiness of the first user. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion may describe the transfer of a physical good; for instance, a digitally signed assertion may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 1, in one embodiment, an address is a textual datum identifying the recipient of virtual currency or another item of value in a digitally signed assertion. In some embodiments, address is linked to a public key, the corresponding private key of which is owned by the recipient of a digitally signed assertion. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion may record a subsequent a digitally signed assertion transferring some or all of the value transferred in the first a digitally signed assertion to a new address in the same manner. A digitally signed assertion may contain textual information that is not a transfer of some item of value in addition to, or as an alternative to, such a transfer. For instance, as described in further detail below, a digitally signed assertion may indicate a confidence level associated with a distributed storage node as described in further detail below.

In an embodiment, and still referring to FIG. 1 immutable sequential listing records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 1, immutable sequential listing may preserve the order in which the at least a posted content took place by listing them in chronological order; alternatively or additionally, immutable sequential listing may organize digitally signed assertions into sub-listings such as "blocks" in a blockchain, which may be themselves collected in a temporally sequential order; digitally signed assertions within a sub-listing may or may not be temporally sequential. The ledger may preserve the order in which at least a posted content took place by listing them in sub-listings and placing the sub-listings in chronological order. The immutable sequential listing may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 4161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 1, immutable sequential listing, once formed, may be inalterable by any party, no matter what access rights that party possesses. For instance, immutable sequential listing may include a hash chain, in which data is added during a successive hashing process to ensure non-repudiation. Immutable sequential listing may include a block chain. In one embodiment, a block chain is immutable sequential listing that records one or more new at least a posted content in a data item known as a sub-listing or "block." An example of a block chain is the BITCOIN block chain used to record BITCOIN transactions and values. Sub-listings may be created in a way that places the sub-listings [[308]] in chronological order and link each sub-listing to a previous sub-listing in the chronological order so that any computing device may traverse the sub-listings in reverse chronological order to verify any at least a posted content listed in the block chain. Each new sub-listing may be required to contain a cryptographic hash describing the previous sub-listing. In some embodiments, the block chain contains a single first sub-listing sometimes known as a "genesis block."

Still referring to FIG. 1, the creation of a new sub-listing may be computationally expensive; for instance, the creation of a new sub-listing may be designed by a "proof of work" protocol accepted by all participants in forming the immutable sequential listing to take a powerful set of computing devices a certain period of time to produce. Where one sub-listing takes less time for a given set of computing devices to produce the sub-listing protocol may adjust the algorithm to produce the next sub-listing so that it will require more steps; where one sub-listing takes more time for a given set of computing devices to produce the sub-listing protocol may adjust the algorithm to produce the next sub-listing so that it will require fewer steps. As an example, protocol may require a new sub-listing to contain a cryptographic hash describing its contents; the cryptographic hash may be required to satisfy a mathematical condition, achieved by having the sub-listing contain a number, called a nonce, whose value is determined after the fact by the discovery of the hash that satisfies the mathematical condition. Continuing the example, the protocol may be able to adjust the mathematical condition so that the discovery of the hash describing a sub-listing and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing according to the protocol is known as "mining." The creation of a new sub-listing may be designed by a "proof of stake" protocol as will be apparent to those skilled in the art upon reviewing the entirety of this disclosure.

Continuing to refer to FIG. 1, in some embodiments, protocol also creates an incentive to mine new sub-listings. The incentive may be financial; for instance, successfully mining a new sub-listing may result in the person or user that mines the sub-listing receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings each sub-listing created in immutable sequential listing may contain a record or at least a posted content describing one or more addresses that receive an incentive, such as virtual currency, as the result of successfully mining the sub-listing.

With continued reference to FIG. 1, where two entities simultaneously create new sub-listings, immutable sequential listing may develop a fork; protocol may determine which of the two alternate branches in the fork is the valid new portion of the immutable sequential listing by evaluating, after a certain amount of time has passed, which branch is longer. "Length" may be measured according to the number of sub-listings in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing branch by the user attempting the fraudulent at least a posted content than the branch being produced by the rest of the participants; as long as the user creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Still referring to FIG. 1, additional data linked to at least a posted content may be incorporated in sub-listings in the immutable sequential listing; for instance, data may be incorporated in one or more fields recognized by block chain protocols that permit a person or computer forming a at least a posted content to insert additional data in the immutable sequential listing. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 1, in some embodiments, virtual currency is traded as a crypto-currency. In one embodiment, a crypto-currency is a digital, currency such as Bitcoins™, Peercoins™, Namecoins™, and Litecoins™. Crypto-currency may be a clone of another crypto-currency. The crypto-currency may be an "alt-coin." Crypto-currency may be decentralized, with no particular user controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular user. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings in a block chain computationally challenging; the incentive for producing sub-listings may include the grant of new crypto-currency to the miners. Quantities of crypto-currency may be exchanged using at least a posted content as described above. In some embodiments, data may be stored on a blockchain. In some instances, updates to data may also be stored on blockchain.

With continued reference to FIG. 1, processor 108 may receive an IP address associated with a known location of user. User data 112 may include IP address. In some embodiments, IP address may be appended to any data packet containing user data 112. In some instances, time elapsed during data transmission may be used to authenticate user. As a non-limiting example, time elapsed may be the time it takes for a data packet to be transmitted between a computing device associated with user and processor 108. In some embodiments, time elapsed may be the time it takes for a first data packet to be transmitted from a computing device associated with user to processor 108 and a second data packet transmitted from processor 108 to user. Processor 108 may authenticate user as a function of time elapsed by comparing actual time elapsed to an expected time elapsed. Expected time elapsed may be calculated as function of network latency, expected data packet size, and the like. In instances of fraud attempts, processor 108 may determine that time elapsed is below a certainty percentage threshold as described above. As a non-limiting example, a spoof account may be located in a different location than the user. Therefore, data packet transmission may take more or less time than expected. Accordingly, processor 108 may flag spoof account as fraudulent. In some instances, a fraudulent verifier may use a proxy server to attempt to authenticate themselves. Data packet transmission may take more or less time than expected. Accordingly, processor 108 may flag fraudulent verifier as fraudulent. It should be noted that IP addresses associated with flagged accounts may be stored in a database to preserve computational resources if multiple fraudulent attempts come from the same account. As a non-limiting example, processor 108 may receive fraudulent user data 112 data packet with a flagged IP address appended to the data packet. Processor 108 may compare the data packet to stored flagged IP addresses. If the IP address appended to the data packet matches a stored flagged IP address, processor 108 may not authenticate verifier. It should be noted that a user may manually add flagged IP addresses, a third-party, source, or both.

Still referring to FIG. 1, user data 112 may be classified to a category 120 using a machine learning model, such as a membership classifier 116, to organize the activity classes. As used in this disclosure, an "category" is a grouping of permissions and services based on level of payment. In some embodiments, category 120 may be a membership tier. Additional disclosure pertaining to membership tiers may be found in U.S. patent application Ser. No. 18/196,174, filed on May 11, 2023, entitled "A METHOD AND AN APPARATUS FOR A PERSONALIZED USER INTERFACE," the entirety of which is incorporated by reference. User data 112 may be classified to various categories. For example, user data 112 may be classified to silver, gold, or a platinum membership. User data 112 may be classified by analyzing the dollar amount of payments over the time of a membership. The amount per month may be determined and compared to current rates. In some embodiments, calculation may involve multiple variables such as signup deals, or changes in membership. For example, if a silver membership is $5 per month and gold is $10, and user data indicates that a user has paid $10 over 3 months, it may be determined that the user was offered 1 free month with a silver membership. Alternatively, the user may have been offered 2 free months on a gold membership. The classification will depend on the timing of the deals. In some instances, user data may indicate missed payments. In that case, the classification would be classified into a delinquent category. In some instances user data may indicate no membership. In that case, the classification would be into a non-member category. A "classifier," as used in this disclosure is a machine learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, processor 108 may generate and train a classifier configured to receive user data 112 and output at least an activity class. Processor 108 and/or another device may generate a classifier using a classification algorithm, defined as a processes whereby a processor 108 derives a classifier from training data. In some embodiments, membership classifier training data may include activities associated with an activity class. In some embodiments, market data statistics may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 108 may generate a web crawler to scrape statistics from a plurality of resource forums/websites. The web crawler may be seeded and/or trained with a reputable website, such as crypto.com, to begin the search. A web crawler may be generated by processor 108. In some embodiments, the web crawler may be trained with information received from a user through user interface. In some embodiments, the web crawler may be configured to generate a web query. A web query may include search criteria received from a user. For example, a user may submit a plurality of websites for the web crawler to search to extract market data statistics from and correlate to user data 112, such as aesthetics based on price, popularity, bid history search criteria, and the like. Additionally, the web crawler function may be configured to search for and/or detect one or more data patterns. A "data pattern" as used in this disclosure is any repeating forms of information. A data pattern may include repeating data statistics related to user data 112. For example, users tend to be more active earlier in the week. In some embodiments, the web crawler may be configured to determine the relevancy of a data pattern. Relevancy may be determined by a relevancy score. A relevancy score may be automatically generated by a processor 108, received from a machine learning model, and/or received from the user. In some embodiments, a relevancy score may include a range of numerical values that may correspond to a relevancy strength of data received from a web crawler function.

Still referring to FIG. 1, membership classifier 116 may use data to prioritize the order in which user data 112 is scheduled. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 108 may be configured to generate classifiers as described throughout this disclosure using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 108 may then calculate a likelihood table by calculating probabilities of different data entries and classification labels. Processor 108 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 3, 4]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, processor 108 may generate a token 124. As used in this disclosure, "token" is a data structure containing information specific to a user experience. As a non-limiting example, the token may include user credentials in addition to membership info such that the token grants a user permissions to different functionalities and perks. In some embodiments, permissions may enable a user accesses to services, discount codes, maintenance, direct messaging to staff, customer service, and the like. In some instances, different categories may include tiered accessed. As a non-limiting example, a gold membership may enable a user access to all available services for user's geographical location. In some instances, a bronze membership level may enable a user to have basic accesses. Higher tier accesses may include any accesses of any lower tiers. As a non-limiting example, a silver membership may include any accesses for a silver membership, in addition to accesses for a bronze membership. In some embodiments, token 124 may be used to generate a non-fungible token (NFT). An "NFT (non-fungible token)," as used in this disclosure, is a unique and non-interchangeable unit of data stored on a digital ledger and/or immutable sequential listing. NFT may be associated with reproducible digital files such as photos, videos, and audio. NFT may also be associated with physical assets such as real estate, collectables, and other commodities. An NFT may represent all or a portion of user data 112 as described further below. In embodiments, the type and amount of user data 112 that is represented in the NFT may be determined by the preference of the user. The creator or user may "tokenize" such assets to be stored on a digital ledger and/or immutable sequential listing, which may ensure non-duplicability and ownership, generate income, and/or enable accessibility of the assets. Persons skilled in the art, upon reviewing the entirety of this disclosure, will be aware of the various embodiments and purposes of tokenizing an asset. In some embodiments, token 124 may be an NFT. In some instances, NFT may be stored on an immutable sequential listing.

Still referring to FIG. 1, token 124 may enable a user access to maintenance suggestions. In some embodiments, user data 112 may include vehicle maintenance data. For the purposes of this disclosure, a "vehicle maintenance data" is data related to a history of vehicle service, repair and maintenance that a user had. As a non-limiting example, the vehicle maintenance data may include any system command that was conducted for the user. For example and without limitation, the vehicle maintenance data may include 'spray water according to the size of the vehicle,' 'spray the soap according to the size of the vehicle,' and the like. For another example and without limitation, the vehicle maintenance data may include 'extra-soak the vehicle,' 'put regular soap on the vehicle,' 'put premium wax on the vehicle,' 'rinse the vehicle,' 'dry the vehicle,' and the like. In some embodiments, the vehicle maintenance data may include a command repetition score. For the purposes of this disclosure, a "command repetition score" is a value representing a number of repetition of a system command. In some embodiments, the command repetition score may include a numerical value such as but not limited to 0, 1, 2, 3, 4, and the like to indicate a number of times the at least a system command was activated for the user. As a non-limiting example, if the at least a system command, 'put premium wax on the vehicle,' was activated in the past 4 times, the command repetition score may include 4. As another non-limiting example, if the at least a system command, 'extra-soak the vehicle,' was activated in the past 2 times, the command repetition score may include 2. As another non-limiting example, if at least a system command, 'extra-soak the vehicle,' was never activated in the past, the command repetition score may include 0.

With continued reference to FIG. 1, in some embodiments, user data 112 may include a user maintenance command. For the purposes of this disclosure, a "user maintenance command" is a command generated by a user for cleaning, repairing and/or maintenance of a vehicle. As a non-limiting example, the user maintenance command may include 'soak a vehicle,' 'extra-soak the vehicle,' 'put soap on the vehicle,' 'put regular soap on the vehicle,' 'put premium soap on the vehicle,' 'rinse the vehicle,' 'extra-rinse the vehicle,' 'dry the vehicle,' 'wax the vehicle,' 'put premium wax on the vehicle,' 'put regular wax on the vehicle,' 'skip drying the vehicle,' 'skip washing the vehicle,' 'skip waxing the vehicle,' 'skip soaking the vehicle,' 'use vacuum for the vehicle,' 'skip vacuuming,' 'shine a tire of the vehicle,' 'skip shining the tire of the vehicle,' 'get a snack from a vending machine,' 'get maintenance tool for the vehicle from the vending machine,' 'get cleaning tool for the vehicle from the vending machine,' and the like. Persons skilled in the art, upon reviewing the entirety of this disclosure, may appreciate various user maintenance command that may be used as the user data 112. In some embodiments, the user maintenance command may include a plurality of the user maintenance command. In some embodiments, at least a processor 112 may receive the user maintenance command from a user device. As a non-limiting example, the user may click an icon that represents the user maintenance command using a user interface of the user device to input the user maintenance command. Additional disclosure related to the user maintenance command may be found in U.S. patent application Ser. No. 18/195,633, filed on May 11, 2023, entitled "METHODS AND APPARATUSES FOR VEHICLE DIMENSIONING IN A CAR WASH," the entirety of which is incorporated by reference.

Still referring to FIG. 1, token 124 may enable a user access to discount codes. As used in this disclosure, "discount codes" are character strings that reduce prices of services and/or add-ons. As a non-limiting example, discount codes may offer a certain percentage off a service and/or product (e.g., 10 percent, 20 percent). In some embodiments, discount codes may reduce membership prices. As a non-limiting example, a gold membership may be discounted at 20 percent off if a user signs up for a year commitment. In some embodiments, discount codes may reduce add-on prices (e.g., scents, waxes, premium washes). It should be noted that discount codes may only be available to higher-tired memberships. In some instances, gold members may receive discount codes on a fixed interval (i.e., weekly, monthly) while bronze members may receive discount codes randomly.

Still referring to FIG. 1, token 124 may enable a user to modify their car wash experience. In some embodiments, car wash experience may include light shows, scents, animations, and things of the like. Users with high-tiered access (e.g., gold membership, silver membership) may have complete access over their car wash experience. In some embodiments, high-tiered access may enable a user to access exclusive car wash experience add-ons. As a non-limiting example, high-tiered access may include exclusive scents and lights shows. In some instances, high-tiered access may enable vehicle specific scents. For example, a user with high-tiered access may drive a Mercedes-Benz™. Token 124 may enable user to select a Mercedes-Benz™ scent for their car wash experience. Vehicle identification may be described in more detail in U.S. patent application Ser. No. 18/195,633, filed on May 11, 2023, entitled "METHODS AND APPARATUSES FOR VEHICLE DIMENSIONING IN A CAR WASH," the entirety of which is incorporated by reference. In some embodiments, lower-tiered memberships (e.g., bronze membership) may have limited customization options. In some embodiments, lower-tiered memberships may include an automated car wash experience. For example, lower-tiered memberships may have access to preset car wash experiences. Preset car wash experiences may not allow for any modifications. In some embodiments, any add-ons for lower tiered memberships may be an additional cost. In some instances, a user having a lower-tiered membership may be prompted to upgrade membership when attempting to purchase an add-on. Membership upgrades may be offered at a discount as a function of membership length and customer history. For example, a user may be a bronze member for a year and want to purchase a scent add-on. Membership upgrade prompt may offer a 10 percent discount on the scent add-on, in addition to a 20 percent discount on a membership upgrade.

Still referring to FIG. 1, token 124 enable a user to communicate with managers of a particular facility and/or customer service. In some embodiments, category 120 may determine response times from customer service. As a non-limiting example, a high-tiered membership may have shorter response times than a low-tiered membership. In some embodiments, response times may be 1 minute, 2 minutes, 10 minutes, 1 hour, or the like. In some instances, high-tiered membership may enable a user to communicate with customer service outside of business hours and/or on the weekends.

Still referring to FIG. 1, token 124 may be mutable. As used in this disclosure, "mutable" is a data structure that may be changed prior to storage. As a non-limiting example, a mutable data structure may be overwritten and replace the previous record. In this instance, the previous record may be lost unless there is a version stored in a recovery cache. In some embodiments, token 124 may be immutable. As used in this disclosure, "immutable" is a data structure that may not be changed prior to storage. As a non-limiting example, an immutable data structure may not be overwritten. In this instance, a copy of the original immutable data structure may be generated by processor 108 and the copy may be mutable. The mutable copy may then be modified in accordance with methods disclosed herein.

Still referring to FIG. 1, modified token 128 may be determined by processor 108 by representing category 120 as an objective function. As a non-limiting example, objective function may include variables associated with discount codes, maintenance, scent, animations, and things of the like. Processor 108 may optimize objective function as a function of one or more variables. In some embodiments, each optimization may be as a function of one variable. Optimizing objective function as a function of one variable may yield a first result. Additional optimizations may be performed as a function of each of the variables, where each optimization may have distinct results. Results from a plurality of optimizations may be utilized to determine the best modification to token 124.

Still referring to FIG. 1, generating modified token 128 may include utilizing a token machine learning model 132. Token machine learning model 132 may be generated in response to processor 108 generating assigning the user data 112 to a category 120. In some embodiments, token 124 may be input into token machine learning model 132 to output modified token 128. In some embodiments, token machine learning model 132 may be trained using training data 136. In some instances, training data 136 may include historical user data correlated to historical categories. Historical user data may be retrieved from a membership database. In some embodiments, historical user data may be retrieved and/or received from a remote device not associated with the user but having authorization credentials associated with the user. For example, a user may login into their cloud linked account from a remote device and enable sending of historical activities to processor 108. In some embodiments, training data 136 may require processing. It should be noted that training data 136 may be processed utilizing techniques and methods described herein. It should be noted that modified token 128 may be generated as a function of user selected services. As used in this disclosure, "user selected services" are any add-ons, car wash experience, or the like as described in this disclosure. User selected services may be dependent of category, as described in this disclosure.

Still referring to FIG. 1, in some embodiments, a services database may include a general list of services. In some instances, general list of services may include categorical services. For example, a category of general list may be "scents" and within the category may be all of the available scents nationally, locally, or location specific. In some instances, user data 112 may include a user's historical services selected. In some embodiments, a user's vehicle may be identified by license plate recognition (LPR) and associated with user data 112. In some instances, user data 112 may include historical services selected. In some embodiments, processor 108 may generate token 124 as a function of historical services selected. In some instances, token 124 may be generated as a function of LPR. Additional disclosure pertaining to may be found in U.S. patent application Ser. No. 18/195,537, filed on May 10, 2023, entitled "APPARATUS AND METHOD FOR AUTOMATIC LICENSE PLATE RECOGNITION OF A VEHICLE," the entirety of which is incorporated by reference.

Still referring to FIG. 1, processor 108 may compare a user's recent selected services to general list of associated services. In some embodiments, general list may be represented by various data structures. Data structures may include, but are not limited to, linked lists, arrays, vectors, objects and/or collections of interrelated or interlinked objects that may contain information relating to associated services. In some embodiments, general list may be stored as entries with a database. Upon reading this disclosure, one of ordinary skill in the art would know the various ways to represent general list. In some instances, the comparison of recent selected services to general list may be used to generate recommendations. As used in this disclosure, "recommendations" are suggestions of services offered to a user. It should be noted that, in some embodiments, recommendations may include services from general list. In some instances, recommendations may include additional services that are not in recent selected services. In some embodiments, recommendations may include an upgraded version of recent selected services. For example, a recent selected service may include a wax coating. A service recommendation may include a premium wax coating. In some instances, recommendations may be limited as a function of category 120. Using the above example, premium wax coating may only be available to user's classified to a gold membership. Processor 108 may not generate service recommendation if a user is not permitted access to it. In some embodiments, service recommendation may include a recommendation to upgrade category. For example, service recommendation to a silver user may include a recommendation to upgrade to a gold membership in order to access service recommendation.

Still referring to FIG. 1, determining recommendations may include eliminating services from a copy of general list. For example, each service on copy of general list may be represented as a vector. Recent selected services may also be represented as a vector. Recent selected services vectors may be compared to general list vectors. General list vectors that fall below a threshold value of similarity may be eliminated. In some instances, multiple iterations of eliminations may occur. Each iteration may have an increased threshold value of similarity. It should be noted that iterations of eliminations may occur until a desired number of recommendations is achieved. In some embodiments, a machine learning model may be utilized to output recommendations. The machine learning model may be trained using training data, where the training data may include historical user data, recent selected services, categories, or the like, correlated to recommendations. In some instances, machine learning model may be trained once with historical user data correlated to recommendations, trained another time with recent selected services to recommendations, and another time with categories to recommendations. In some embodiments, training data may include user-labeled examples. In some embodiments, training data may be retrieved from a database. In some instances, training data may be input by a user. In some instances, Processor 108 may then compare output recommendations from each iteration of the machine learning model and eliminate any recommendations that is not present in at least two of the outputs. In some embodiments, recommendations that are not present in all three of the output recommendations may be eliminated. It should be noted that the various ways determining recommendations may be used to generate modified token 128.

Still referring to FIG. 1, processor 108 may generate at least an interface element. Processor 108 may transmit the at least an interface element to a display. In some instances, display may be a graphical user interface (GUI). In some embodiments, display may include, but it is not limited to a liquid crystal display (LCD), a cathode ray tube (CRT), a plasma display, a light emitting diode (LED) display, and any combinations thereof. Display may be utilized in combination with processor 108 to provide graphical representations of aspects of the present disclosure. In some embodiments, at least an interface element may be selected from a library of interface elements. In some instances, interface element library may be sorted into categories. Processor 108 may select at least an interface element that is closely associated with scale limiting factor. As a non-limiting example, each interface element may have a vector representation. Vector representation of each interface element may be compared to scale limiting factor vector representation for a degree of similarity. Interface element with the highest degree of similarity may be selected.

Still referring to FIG. 1, generating generate at least an interface element may include a template. Template may be a border or an entire interface itself. In some embodiments, at least an interface element may include a push notification. In some instances, push notification may be displayed on display. In some instances, display may include a graphical user interface (GUI) configured to receive user inputs. User may interact with push notifications via GUI.

Still referring to FIG. 1, processor 108 may transmit the at least an interface element to display. In some instances, the display may be a GUI. In some embodiments, the display may include, but it is not limited to, a liquid crystal display (LCD), a cathode ray tube (CRT), a plasma display, a light emitting diode (LED) display, and any combinations thereof. Display may be utilized in combination with processor 108 to provide graphical representations of aspects of the present disclosure.

Still referring to FIG. 1, processor 108 may transmit at least an interface element to display via a wired connection and/or a wireless connection. Wired connection transmission may include direct connection between processor and display. In some instances, wired connection may include intermediate relays disposed on a transmission pathway. In sone embodiments, data structure that includes at least an interface element to be displayed may need to be preprocessed prior to display. As a non-limiting example, at least an interface element data may have a dither applied. As used in this disclosure, "dither" is an applied form of noise used to randomize quantization error, preventing large-scale patterns such as color banding in images. In some instances, dithering may be performed at processor 108 prior to transmission. In another embodiment, dither may occur at another hardware portion of apparatus 100. Total transmission from processor 108 to display may take longer if at least an interface element data is transmitted from processor 108 to another hardware unit, then to display than if it were direct.

Still referring to FIG. 1, processor 108 may transmit at least an interface element data to display and receive a return signal. In some embodiments, return signal may contain the same number of packets as the initial transmission. In some embodiments, return signal may have a percent loss of data packets. Percent loss of data packets may be required to be below a threshold (e.g., 30%, 10%, 6%) to confirm transmission. In some instances, percent loss may be above a threshold percent loss. Processor 108 may resend at least an interface element data signal upon determining that percent loss is above a threshold percent loss. In some embodiments, processor 108 may transmit an error signal to display in response to determining that percent loss is above a precent loss threshold. It should be noted that error signal may include a substantially smaller packet count than at least an interface element data signal. Advantageously, error signal may rarely experience transmission errors. In some embodiments, processor 108 may determine an additional error in transmitting error signal, using methods as described above.

Still referring to FIG. 1, processor 108 may generate a personalized user interface 140 as a function of modified token 128. In some embodiments, processor 108 may generate user interface 140 as a function of modified token 128. In some embodiments, user interface 140 may include at least an interface element. As used in this disclosure, "at least an interface element" is a portion of user interface. In some embodiments, at least an interface element may be an event handler. In some embodiments, at least an interface element may include a service identifier. In some embodiments, at least an interface element may be a graphical template. Graphical template may be a distinct arrangement of icons, text, or the like, on user interface 140. In some instances, graphical template may be selected from a library of graphical templates. As a non-limiting example, token 124 and modified token 128 may cause processor 108 to generate a user interface 140 that is personalized. Personalized user interface 140 may include user selected services, category, offers, vehicle information, and things of the like. Advantageously, apparatus 100 may store previous selections such that a user does not have to select options each time the visit. In some instances, user may be prompted to make new selections if one or more of their saved selections is not available.

Still referring to FIG. 1, user interface 140 may include a plurality of event handlers. As used in this disclosure, an "event handler graphic" is a graphical element with which a user of remote device may interact to enter data, for instance and without limitation for a search query or the like as described in further detail below. An event handler graphic may include, without limitation, a button, a link, a checkbox, a text entry box and/or window, a drop-down list, a slider, or any other event handler graphic that may occur to a person skilled in the art upon reviewing the entirety of this disclosure. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device to apparatus 100. In some embodiments, event handler may be associated with a service identifier. As used in this disclosure, a "service identifier" is a graphical indication of a service accessible based on a user's access. In some embodiments, a portion of service identifiers may be selectively available to users of particular category.

In an embodiment, and continuing to refer to FIG. 1, event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on a computing device; for instance, data may be saved wholly or in part as a "cookie" which may include data or an identification of remote device to prompt provision of cross-session state variable by apparatus 100, which may store the data on apparatus 100. Alternatively, or additionally, apparatus 100 may use login credentials, device identifier, and/or device fingerprint data to retrieve cross-session state variable, which apparatus 100 may transmit to remote device. Cross-session state variable may include at least a prior session datum. A "prior session datum" may include any element of data that may be stored in a cross-session state variable. Event handler graphic may be further configured to display the at least a prior session datum, for instance and without limitation auto-populating user query data from previous sessions.

Figure 2:
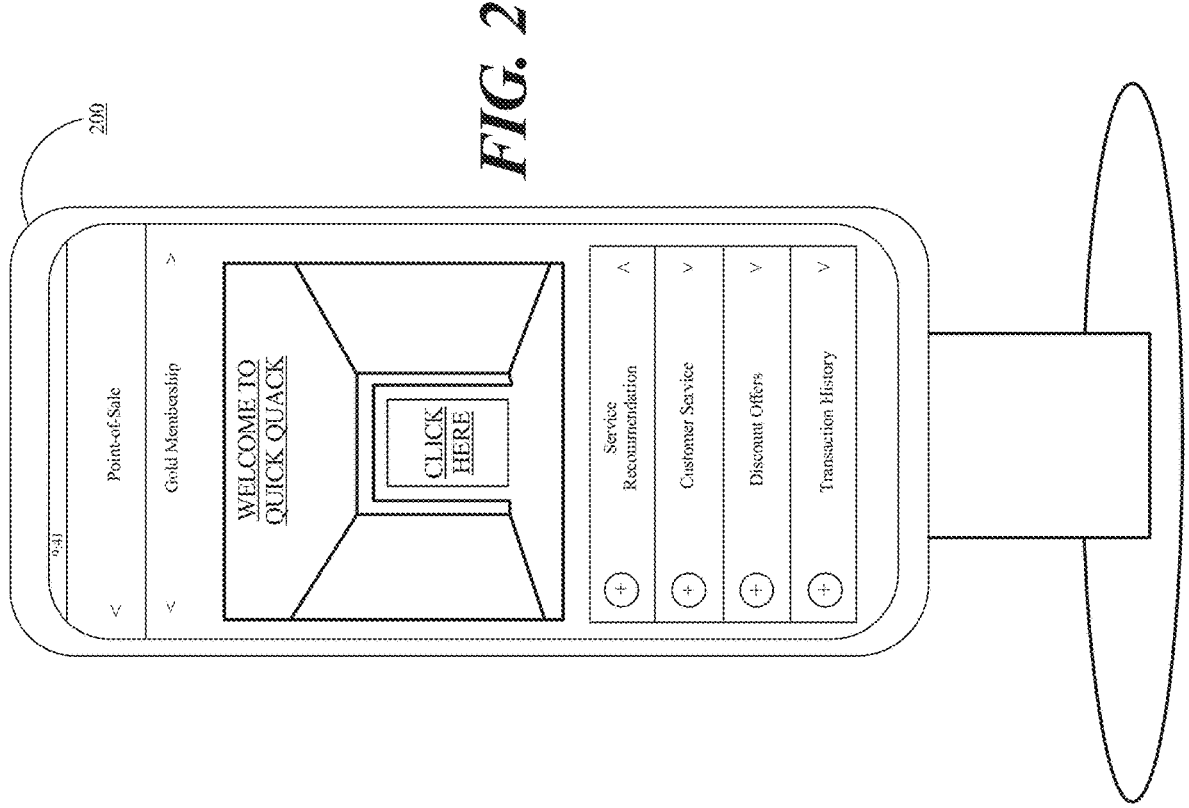
FIG. 2 illustrates an exemplary embodiment of a terminal.

Now referring to FIG. 2, a point-of-sale (POS) terminal 200 is shown. In some embodiments, a user may click one or more toggle options disposed the POS 200. Each toggle option may prompt a user with multiple options based at least on a category. In some embodiments, one or more options may be selected. In some embodiments, user interface 200 may display a virtual depiction of a car wash tunnel with toggle options disposed therewith. Advantageously, POS 200 may allow a user to personalize car wash experience based on their preferences and category. It should be noted that each toggle option may be an event handler as described in disclosure. In some embodiments, POS 200 may be positioned inside of a facility. In some embodiments, POS may be positioned outside. In some instances, POS may be manufactured utilizing weather resistant materials in order to prevent damage from inclement weather conditions. In some embodiments, POS 200 may be configured to be removed from a stand. Advantageously, POS 200 may be carried and/or have multiple configurations to better accommodate users.

Figure 3:
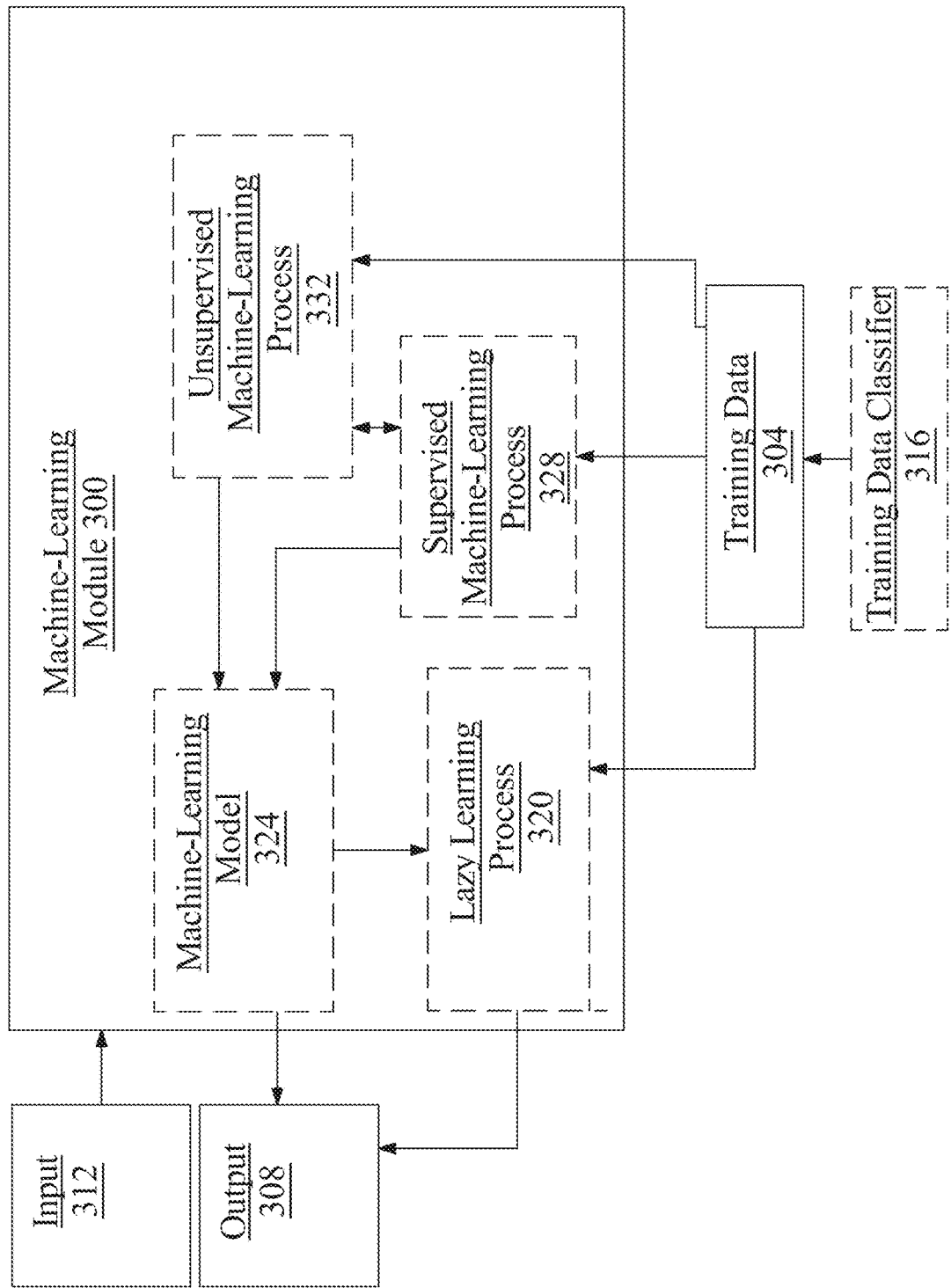
FIG. 3 is a block diagram of an exemplary machine learning process.

Referring now to FIG. 3, an exemplary embodiment of a machine learning module 300 that may perform one or more machine learning processes as described in this disclosure is illustrated. Machine learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine learning algorithms, and/or automated association of data in the data entry with descriptors or into a given format. The ability to categorize data entries automatedly may enable the same training data 304 to be made applicable for two or more distinct machine learning algorithms as described in further detail below. Training data 304 used by machine learning module 300 may correlate any input data as described in this disclosure to any output data as described in this disclosure.

Further referring to FIG. 3, training data may be filtered, sorted, and/or selected using one or more supervised and/or unsupervised machine learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to an age group, a socioeconomic class, race, ethnicity, or the like.

Still referring to FIG. 3, machine learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine learning processes as described in this disclosure may be used to generate machine learning models 324. A "machine learning model," as used in this disclosure, is a mathematical and/or algorithmic representation of a relationship between inputs and outputs, as generated using any machine learning process including without limitation any process as described above, and stored in memory; an input is submitted to a machine learning model 324 once created, which generates an output based on the relationship that was derived. For instance, and without limitation, a linear regression model, generated using a linear regression algorithm, may compute a linear combination of input data using coefficients derived during machine learning processes to calculate an output datum. As a further non-limiting example, a machine learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine learning algorithms may include at least a supervised machine learning process 328. At least a supervised machine learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure and outputs and as described in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine learning process 328 that may be used to determine relation between inputs and outputs. Supervised machine learning processes may include classification algorithms as defined above.

Further referring to FIG. 3, machine learning processes may include at least an unsupervised machine learning processes 332. An unsupervised machine learning process, as used herein, is a process that derives inferences in datasets without regard to labels; as a result, an unsupervised machine learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine learning module 300 may be designed and configured to create a machine learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine learning algorithms may include, without limitation, linear discriminant analysis. Machine learning algorithm may include quadratic discriminant analysis. Machine learning algorithms may include kernel ridge regression. Machine learning algorithms may include support vector machines, including without limitation support vector classification-based regression processes. Machine learning algorithms may include stochastic gradient descent algorithms, including classification and regression algorithms based on stochastic gradient descent. Machine learning algorithms may include nearest neighbors algorithms. Machine learning algorithms may include various forms of latent space regularization such as variational regularization. Machine learning algorithms may include Gaussian processes such as Gaussian Process Regression. Machine learning algorithms may include cross-decomposition algorithms, including partial least squares and/or canonical correlation analysis. Machine learning algorithms may include naïve Bayes methods. Machine learning algorithms may include algorithms based on decision trees, such as decision tree classification or regression algorithms. Machine learning algorithms may include ensemble methods such as bagging meta-estimator, forest of randomized trees, AdaBoost, gradient tree boosting, and/or voting classifier methods. Machine learning algorithms may include neural net algorithms, including convolutional neural net processes.

Figure 4:
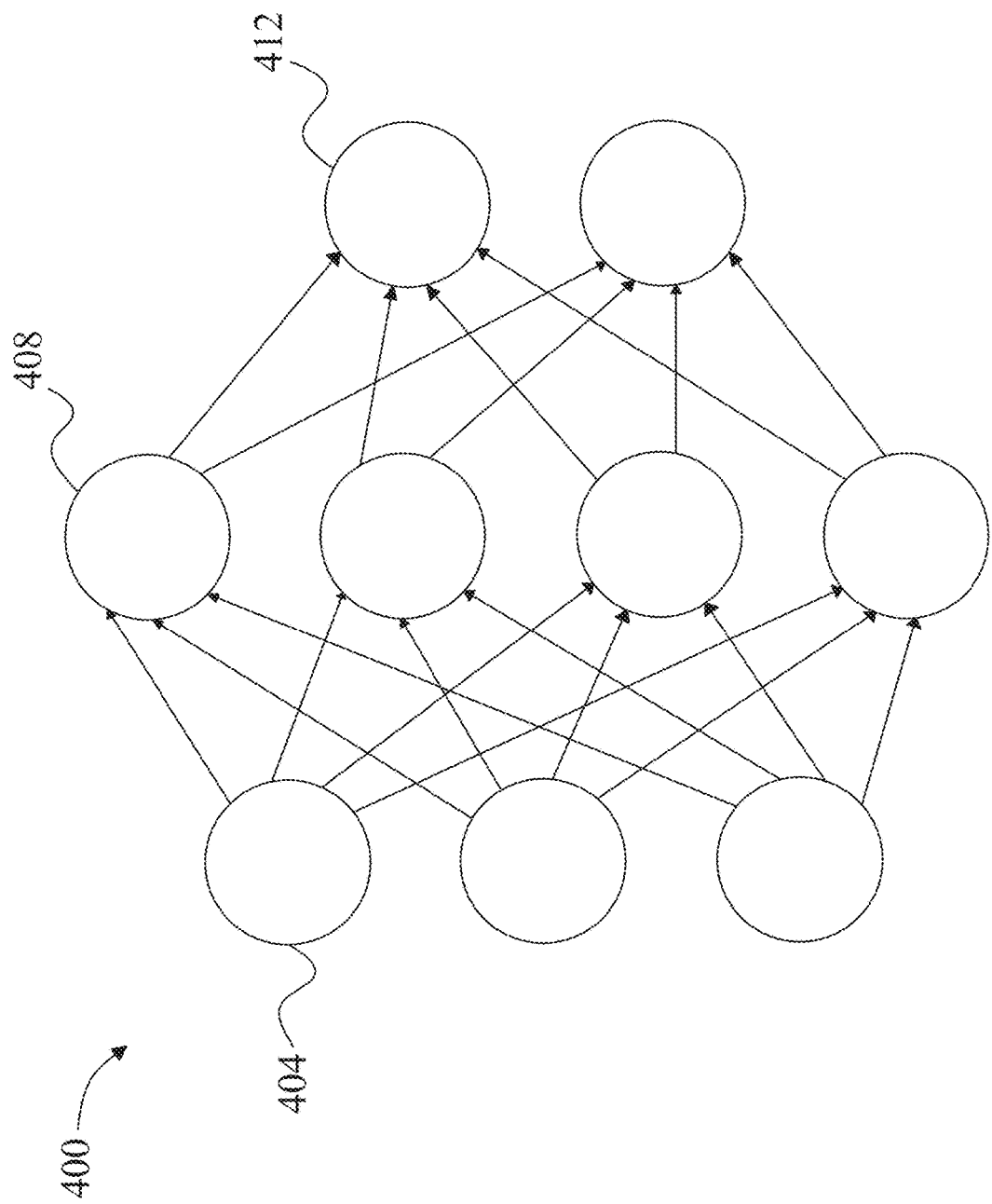
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
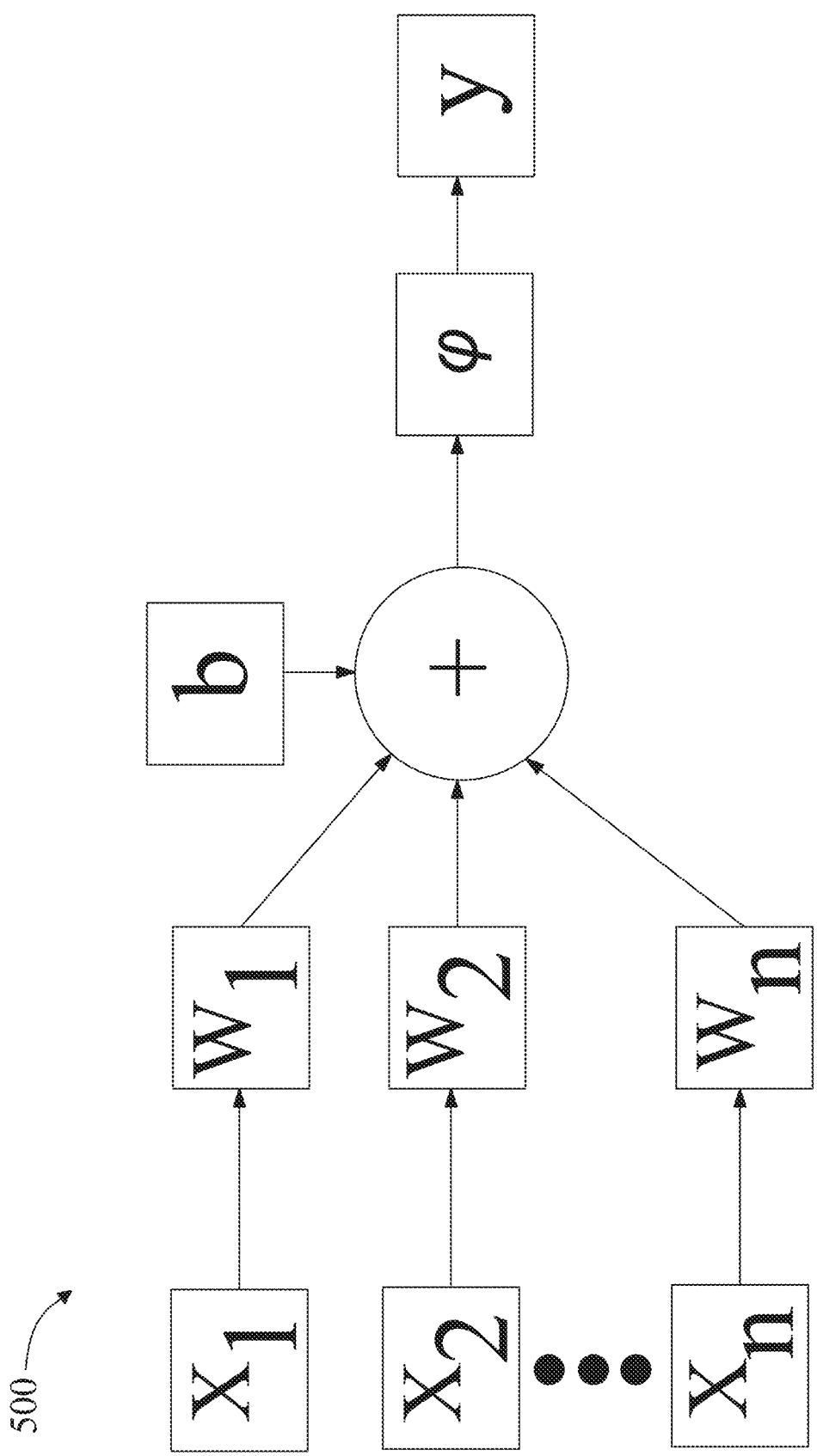
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
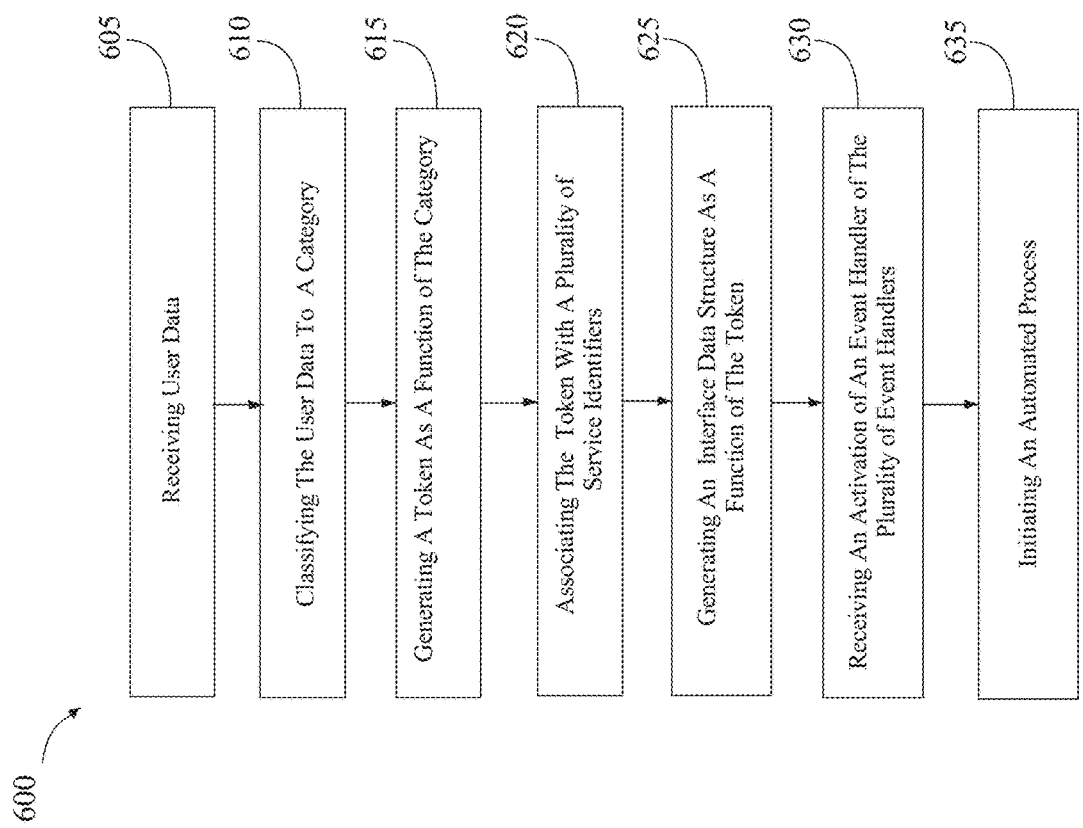
FIG. 6 is a flow diagram of an exemplary method for generating a terminal interface.

Referring now to FIG. 6, an exemplary method 600 for generating a terminal interface may include, at step 605 receiving, by a processor, user data. This may occur as described above in reference to FIGS. 1-5.

With continued reference to FIG. 6, method 600 may include at step 610 of classifying, by the processor, the user data to a category. This may occur as described above in reference to FIGS. 1-5.

With continued reference to FIG. 6, method 600 may include, at step 615, generating, by the processor, a token as a function of the category. This may occur as described above in reference to FIGS. 1-5.

With continued reference to FIG. 6, method 600 may include, at step 620, associating, by the processor, the token with a plurality of service identifiers. This may occur as described above in reference to FIGS. 1-5.

With continued reference to FIG. 6, method 600 may include, at step 625, generating, by the processor, a personalized user interface as a function of the token. This may occur as described above in reference to FIGS. 1-5.

With continued reference to FIG. 6, method 600 may include, at step 630, receiving an activation of an event handler of a plurality of event handlers. This may occur as described above in reference to FIGS. 1-5.

With continued reference to FIG. 6, method 600 may include, at step 635, initiating an automated process. This may occur as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
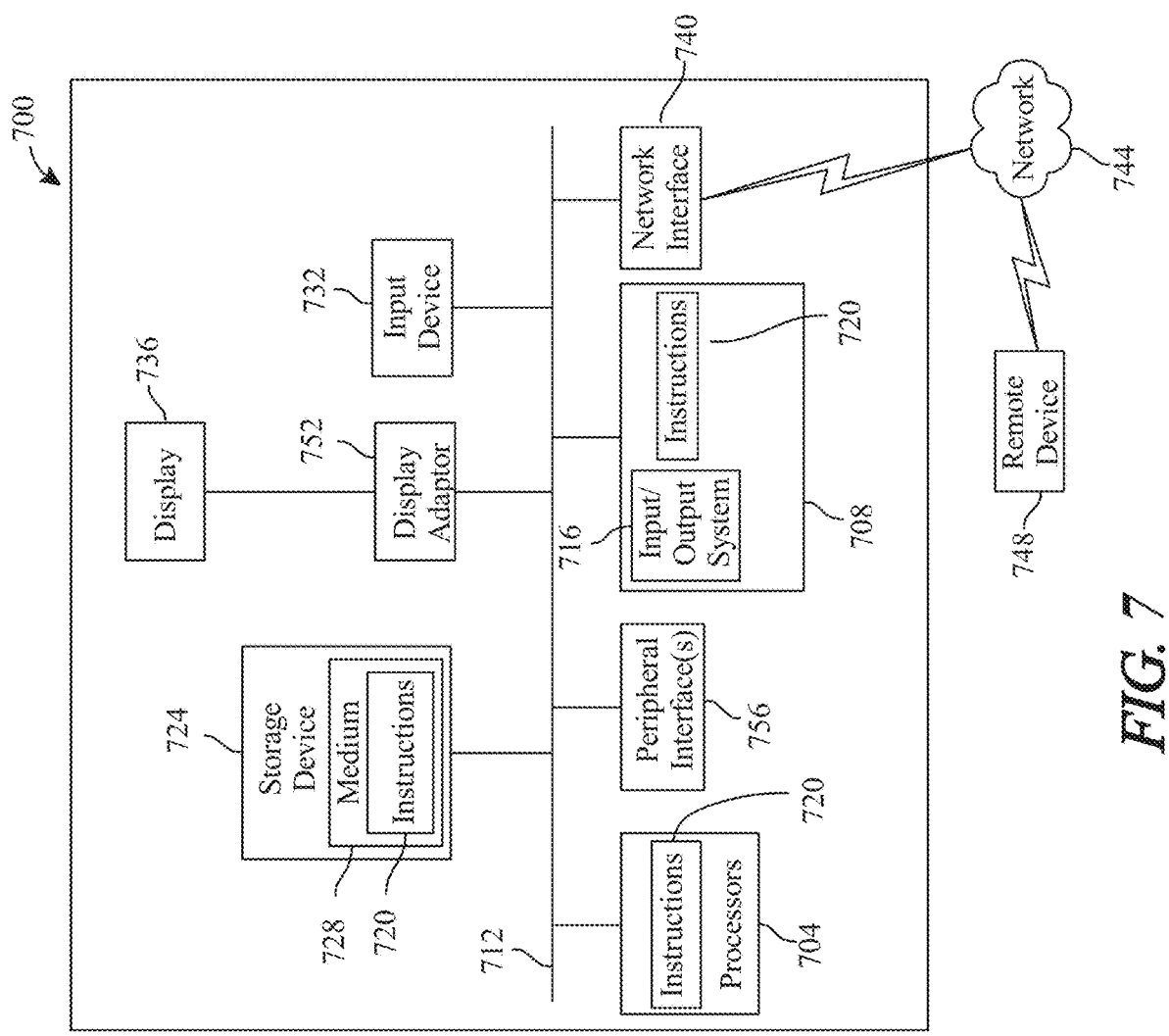
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a terminal interface, the apparatus comprising:
   at least a processor; and
   a memory communicatively connected to the at least a processor, the memory containing instructions configuring the at least a processor to:
   receive user data, wherein the user data comprises a digital signature comprising an IP address associated with a known location of the user;
   authenticate the user as a function of the IP address, wherein authenticating the user further comprises:
   determining a time elapsed during data packet transmission between a computing device associated with the user and the at least a processor; and
   authenticating the user based on a comparison of the time elapsed and a certainty threshold;
   classify the user data to a category;
   generate a token, as a function of the category, wherein generating the token comprises:
   accessing a general list of recommendations;
   comparing the general list of recommendations to the user data, wherein the user data comprises recent selections;
   determining at least a recommendation as a function of comparing the general list to the user data;
   generating the token as a function of the at least a recommendation;
   associate the token with a plurality of service identifiers;
   associate the token with a tiered-membership system;
   generate an interface data structure as a function of the token, wherein generating the interface data structure further comprises generating a plurality of event handlers and associated display elements;
   determine a device identifier as a function of the digital signature;
   retrieve, from a user device, an activation of an event handler of the plurality of event handlers, wherein retrieving the activation of the event handler comprises retrieving a cross-session state variable as a function of the device identifier; and initiate, as a function of the activation, an automated process, wherein the automated process comprises a car wash experience, wherein the token enables a user to modify the car wash experience as a function of the tiered-membership system, wherein a membership tier of the user determines a level of modification of the car wash experience.

2. The apparatus of claim 1, wherein generating the interface data structure further comprises:
associating each event handler with a service identifier of the plurality of service identifiers; and
associating each display element with an event handler of the plurality of event handlers; and
configuring a user device to display each display element.

3. The apparatus of claim 1, wherein classifying the user data further comprises generating a machine learning model, wherein generating the machine learning model further comprises:
creating a training set, wherein the training set comprises user data correlated to a category;
training the machine learning model using the training set; and
generating the machine learning model as a function of the user data.

4. The apparatus of claim 1, wherein generating the token comprises storing a modified copy of an immutable version of the token.

5. The apparatus of claim 1, wherein comparing the general list of recommendations to the user data further comprises eliminating recommendations as a function of a degree of similarity between the general list of recommendations and the user data.

6. The apparatus of claim 5, wherein eliminating recommendations further comprises:
representing the general list of recommendations as a first vector set;
representing the user data as a second vector set;
comparing the first vector set and the second vector set; and
eliminating the recommendations associated with vectors from the first vector set that fall below a threshold degree of similarity.

7. The apparatus of claim 1, wherein the user data comprises an authorization image data and wherein the at least a processor is further configured to compare the authorization image data and a stored pixel data as a function of a set threshold.

8. The apparatus of claim 1, wherein generating the token further comprises generating a non-fungible token (NFT) representing vehicle maintenance data.

9. The apparatus of claim 8, wherein generating the NFT further comprises storing the NFT on an immutable sequential listing.

10. A method for generating a terminal interface, the method comprising:
receiving, by a processor, user data, wherein the user data comprises a digital signature comprising an IP address associated with a known location of the user;
authenticating, by the processor, the user as a function of the IP address, wherein authenticating the user further comprises:
determining a time elapsed during data packet transmission between a computing device associated with the user and the processor; and
authenticating the user based on a comparison of the time elapsed and a certainty threshold;
classifying, by the processor, the user data to a category;
generating, by the processor, a token as a function of the category, wherein generating the token comprises:
accessing a general list of recommendations;
comparing the general list of recommendations to the user data, wherein the user data comprises selections;
determining at least a recommendation as a function of comparing the general list to the user data;
generating the token as a function of the at least recommendation;
associating, by the processor, the token with a plurality of service identifiers;
associating, by the processor, the token with a tiered-membership system;
generating, by the processor, an interface data structure as a function of the token, wherein generating the interface data structure further comprises generating a plurality of event handlers and associated display elements;
determining, by the processor, a device identifier as a function of the digital signature;
retrieving, from a user device, an activation of an event handler of the plurality of event handlers, wherein retrieving the activation of the event handler comprises retrieving a cross-session state variable as a function of the device identifier; and
initiating, as a function of the activation, an automated process, wherein the automated process comprises a car wash experience, wherein the token enables a user to modify the car wash experience as a function of the tiered-membership system, wherein a membership tier of the user determines a level of modification of the car wash experience.

11. The method of claim 10, wherein generating the interface data structure further comprises:
associating each event handler with a service identifier of the plurality of service identifiers; and
associating each display element with an event handler of the plurality of event handlers; and
configuring a user device to display each display element.

12. The method of claim 10, wherein classifying the user data further comprises generating a machine learning model, wherein generating the machine learning model further comprises:
creating a training set, wherein the training set comprises user data correlated to a category;
training the machine learning model using the training set; and
generating the machine learning model as a function of the user data.

13. The method of claim 10, wherein generating the token comprises storing a modified copy of an immutable version of the token.

14. The method of claim 10, wherein comparing the general list of recommendations to the user data further comprises eliminating recommendations as a function of a degree of similarity between the general list of recommendations and the user data.

15. The method of claim 14, wherein eliminating recommendations further comprises:
representing the general list of recommendations as a first vector set;
representing the user data as a second vector set;

comparing the first vector set and the second vector set; and eliminating the recommendations associated with vectors from the first vector set that fall below a threshold degree of similarity.

16. The method of claim 10, wherein the user data comprises an authorization image data and wherein the method further comprises comparing, by the processor, the authorization image data and a stored pixel data as a function of a set threshold.

17. The method of claim 10, wherein generating the token further comprises generating a non-fungible token (NFT) representing vehicle maintenance data.

18. The method of claim 17, wherein generating the NFT further comprises storing the NFT on an immutable sequential listing.

* * * * *